No. 628,755. Patented July 11, 1899.
H. CAMPKIN.
WHEEL FOR VEHICLES.
(Application filed Feb. 14, 1898.)
(No Model.)
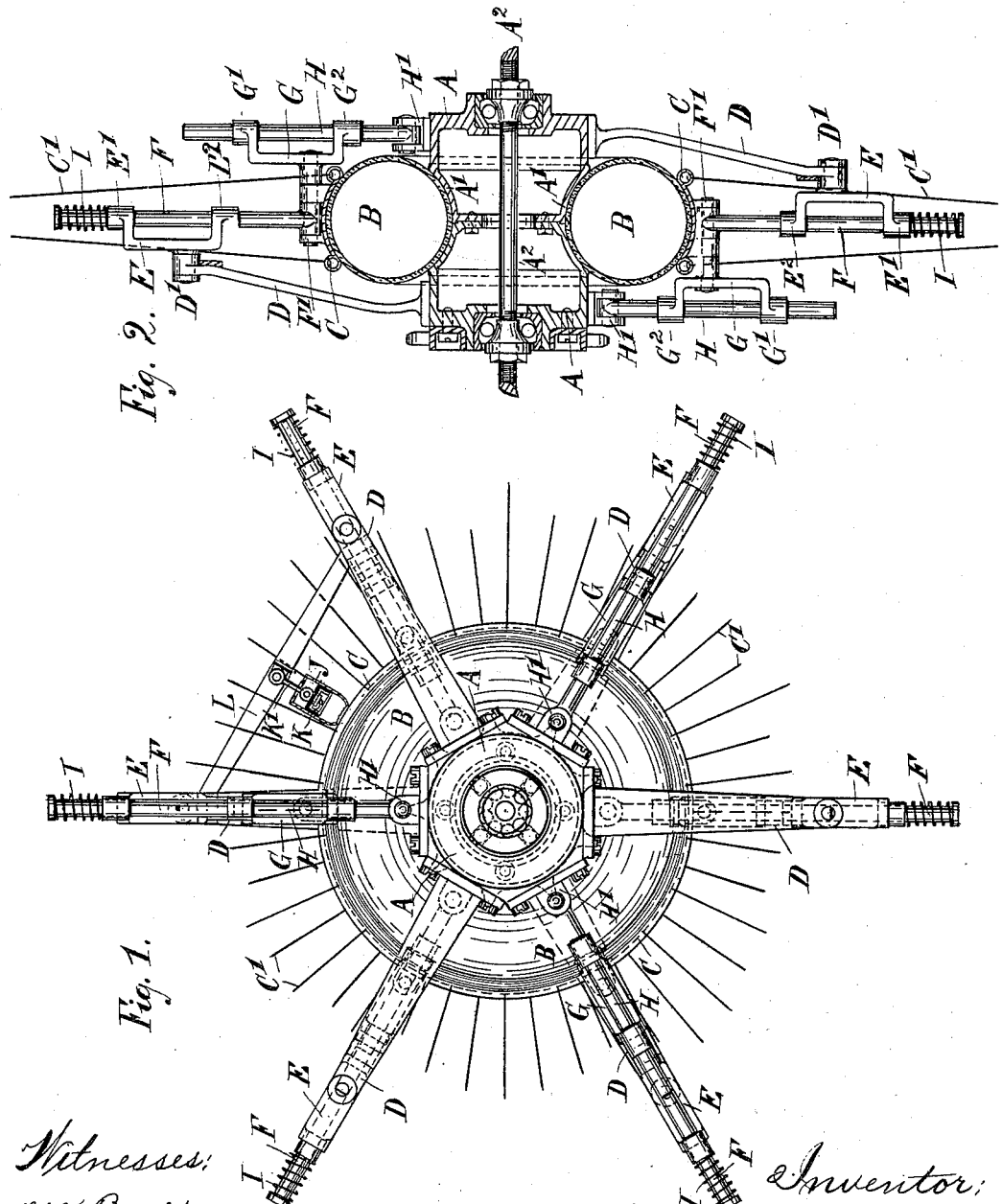

UNITED STATES PATENT OFFICE.

HARRY CAMPKIN, OF NOTTINGHAM, ENGLAND.

WHEEL FOR VEHICLES.

SPECIFICATION forming part of Letters Patent No. 628,755, dated July 11, 1899.

Application filed February 14, 1898. Serial No. 670,264. (No model.)

*To all whom it may concern:*

Be it known that I, HARRY CAMPKIN, a subject of the Queen of England, residing at Nottingham, England, have invented certain new and useful Improvements in Spring or Pneumatic or Combined Spring and Pneumatic Wheels for Vehicles; and I do hereby declare the following to be a full, clear, and exact description of the same.

This invention relates to improvements in or applicable to spring or pneumatic or combined spring and pneumatic wheels for cycles, motor-cars, carriages, and other road-vehicles in which the outer part of the wheel is capable of moving into an eccentric position relatively to the inner part against the action of a pneumatic chamber or springs, or both; and it relates more particularly to means for maintaining the outer part of the wheel parallel to its plane of rotation and communicating the driving power from the hub to this outer movable part of the wheel.

In the accompanying drawings, Figure 1 is a side elevation, and Fig. 2 a vertical cross-section, showing the middle part of a wheel constructed according to my invention.

According to this invention in a pneumatic wheel the hub A, which is mounted on an axle $A^2$ in the usual manner, is formed with an annular seat A', on which is mounted a flexible annular air-chamber B. This air-chamber may be formed of india-rubber strengthened with canvas or other material and may be provided with an inflation-valve of any well-known form or be inflated in the manner hereinafter described.

In the drawings the hub A is shown divided in the middle in order that the air-chamber B may be placed in position; but if the seating A' were formed in an enlarged portion of the middle of the hub instead of as shown the air-chamber could be sprung into position and the hub in this case be formed in one piece.

Mounted on the periphery of the annular air-chamber B, and thus inclosing it, is a rim C of suitable section. This rim C is connected to the outer rim of the wheel by spokes C', disposed in any well-known manner. The outer rim of the wheel (which is not shown in the drawings) is concentric with the rim C and may be provided with a solid or pneumatic tire, as preferred.

Up to this point the wheel described may be said to be similar to wheels of well-known construction, and I will now proceed to describe those parts which comprise the main feature of my invention.

On each side of the hub A are three or any other convenient number of radial arms D. These arms D may be secured to or formed integrally with the hub and are so distributed that those on one side alternate with those on the other side, as shown. Pivoted in the outer end D' of each radial arm on an axis at right angles to the plane of rotation of the wheel is a bracket E, provided with guideways E' $E^2$, in which latter is mounted a pin F. These pins F can slide longitudinally in their respective guideways E' $E^2$. The inner ends of these pins F are pivoted to the rim C at F', also on an axis at right angles to the plane of rotation of the wheel. When the rim C and the outer part of the wheel are moved into an eccentric position relatively to the hub A, the pins F will either slide in the guideways E' $E^2$ of the brackets E or said brackets E and pins F will oscillate about their respective pivots D' F', or both movements may occur in one set, according to the position they for the time occupy relatively to the eccentricity of the rim C and outer part of the wheel with the hub A. The arrangement will thus offer no resistance to the outer part of the wheel moving into an eccentric position relatively to the hub, but will, however, hold or maintain the outer part of the wheel rigidly parallel to its plane of rotation.

The arrangement described may be assisted by a duplicate arrangement in which the several parts are placed in the reverse position, as shown.

Pivoted to the rim C, opposite to each of the radial arms D of the arrangement previously described and preferably on the same pivot F' as the pins F, are a corresponding number of brackets G, provided with guideways G' $G^2$. Mounted in the guideways G' $G^2$ of each bracket G is a pin H, the whole of which are pivoted at their inner ends to the hub A or brackets H' secured thereto. This arrangement works in precisely the same manner as the arrangement previously described.

The arrangement described has in some cases to perform another office—that is, communicate the driving power from the hub to the outer part of the wheel.

In order to prevent undue oscillation of the pivoted brackets E and G owing to the driving power being communicated from the hub A to the rim C and outer part of the wheel through the pins F H and said brackets or from other causes, the inner guideways $E^2 G^2$ on each bracket are placed nearer to their respective pivots D' F' than the outer guideways E' G', and it will thus be seen that when the brackets oscillate the inner guideways $E^2 G^2$ will move through a shorter radius than the outer guideways E' G', and the resistance to further movements will thus be gradually increased up to a certain point, beyond which they will not move.

In order to assist the pneumatic air-chamber A, springs I may be placed on the pins F between the brackets E and the outer ends of said pins. By employing springs I of sufficient strength the pneumatic chamber B may be dispensed with and the whole of the resiliency obtained from the said springs, thus constituting it a spring-wheel.

In order to automatically inflate or maintain the air in the air-chamber B at a constant pressure, one or more pumps may be employed and be disposed as follows: The barrel J of each pump (see Fig. 1) is secured to the rim C, and said barrel is connected to the interior of the air-chamber by a pipe provided with a non-return valve. The piston K is connected by a link K' to a rigid stay or bar L, extending from one radial arm D to the next arm D on the opposite side of the hub.

I claim—

1. In a spring or pneumatic wheel for vehicles, the combination with the hub and the outer part of the wheel, of a radial arm on the hub, a bracket provided with guideways pivoted in the end of the radial arm, and a pin pivoted to the outer part of the wheel and working in the guideways in the pivoted bracket, substantially as described.

2. In a spring or pneumatic wheel for vehicles, the combination with the hub and the outer part of the wheel, of a radial arm on the hub, a bracket provided with guideways pivoted in the end of the radial arm, a pin pivoted to the outer part of the wheel and working in the guideways in the pivoted bracket, and a spring on the said pin, substantially as described.

3. In a spring or pneumatic wheel for vehicles, the combination with the hub and outer part of the wheel, of a bracket provided with guideways pivoted to the outer part of the wheel, and a pin pivoted to the hub and working in the guideways in the pivoted bracket, substantially as described.

4. In a spring or pneumatic wheel for vehicles, the combination with the hub and outer part of the wheel, of a radial arm on the hub, a bracket provided with guideways pivoted to the radial arm, a pin pivoted to the rim and working in the guideways in the pivoted bracket, a bracket provided with guideways pivoted to the outer part of the wheel, and a pin pivoted to the hub and working in guideways in the pivoted bracket, substantially as described.

In witness whereof I have hereunto set my hand in presence of two witnesses.

HARRY CAMPKIN.

Witnesses:
H. C. SHELDON,
J. W. THORMAN.